United States Patent
Lin et al.

(10) Patent No.: US 12,235,437 B2
(45) Date of Patent: Feb. 25, 2025

(54) PIXEL ARRAY SUBSTRATE AND ELECTROWETTING DISPLAY PANEL

(71) Applicant: AUO Corporation, Hsinchu (TW)

(72) Inventors: Chin-An Lin, Hsinchu (TW); Kun-Cheng Tien, Hsinchu (TW)

(73) Assignee: AUO Corporation, Hsinchu (TW)

( * ) Notice: Subject to any disclaimer, the term of this patent is extended or adjusted under 35 U.S.C. 154(b) by 213 days.

(21) Appl. No.: 18/090,514

(22) Filed: Dec. 29, 2022

(65) Prior Publication Data

US 2024/0061234 A1 Feb. 22, 2024

(30) Foreign Application Priority Data

Aug. 19, 2022 (TW) .................................. 111131368

(51) Int. Cl.
*G02B 26/00* (2006.01)
*G09G 3/34* (2006.01)

(52) U.S. Cl.
CPC .......... *G02B 26/005* (2013.01); *G09G 3/348* (2013.01); *G02B 2207/115* (2013.01); *G09G 2300/0426* (2013.01)

(58) Field of Classification Search
CPC .......... G02B 26/005; G02B 2207/0426; G09G 3/348; G09G 2300/0426
USPC ........................................................ 345/84
See application file for complete search history.

(56) References Cited

U.S. PATENT DOCUMENTS

| | | | |
|---|---|---|---|
| 10,516,057 B1* | 12/2019 | Sakai | H01L 27/124 |
| 2009/0195850 A1* | 8/2009 | Takahashi | G09G 3/3433 359/226.3 |
| 2011/0194168 A1* | 8/2011 | Slack | G02B 26/005 359/290 |
| 2013/0258443 A1* | 10/2013 | Jung | G02B 26/005 359/290 |
| 2013/0278994 A1* | 10/2013 | Feil | G02B 26/005 29/874 |
| 2014/0355099 A1* | 12/2014 | Tsai | G02B 26/005 359/290 |
| 2020/0089035 A1 | 3/2020 | Tsai et al. | |
| 2021/0356732 A1 | 11/2021 | Feil | |

FOREIGN PATENT DOCUMENTS

| | | |
|---|---|---|
| TW | 200407951 | 5/2004 |
| WO | 2012169881 | 12/2012 |

* cited by examiner

*Primary Examiner* — Mark Edwards
(74) *Attorney, Agent, or Firm* — JCIPRNET

(57) ABSTRACT

A pixel array substrate including a substrate and multiple pixel units is provided. The pixel units are disposed on the substrate, and each include at least one active device, a pixel electrode and at least one storage capacitor. The pixel electrode is electrically connected to the at least one active device, and has multiple openings. The at least one storage capacitor is electrically connected to the pixel electrode and the at least one active device. The at least on storage capacitor completely overlaps a part of the openings of the pixel electrode. An electrowetting display panel adopting the pixel array substrate is also provided.

18 Claims, 14 Drawing Sheets

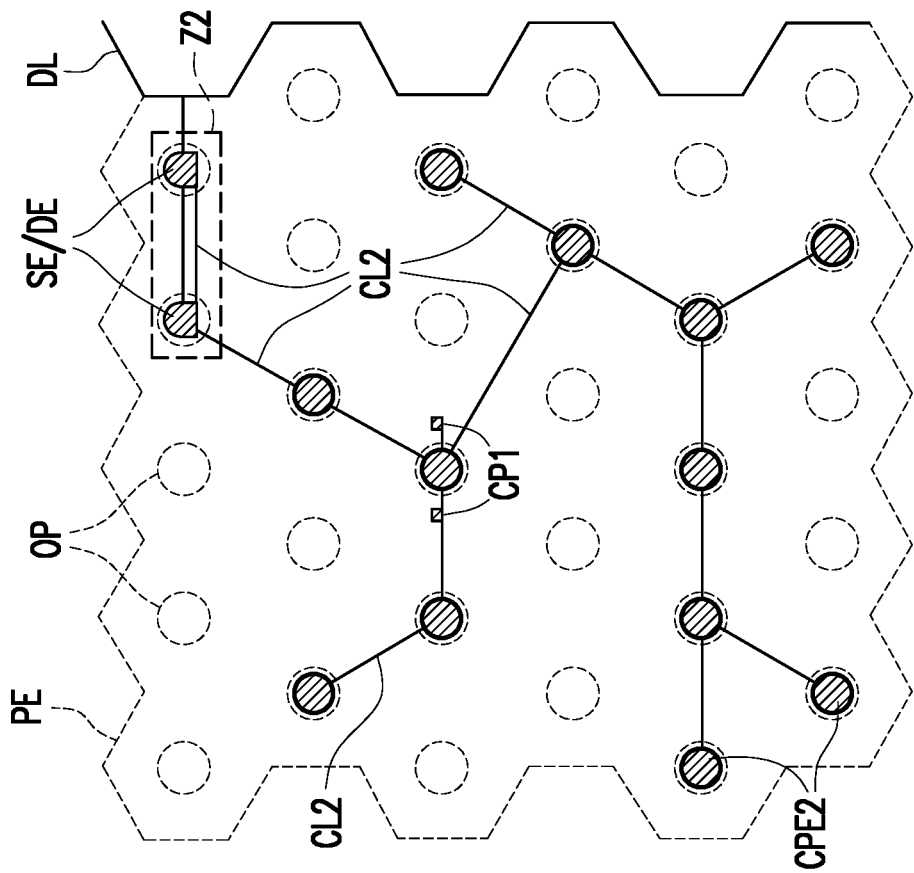
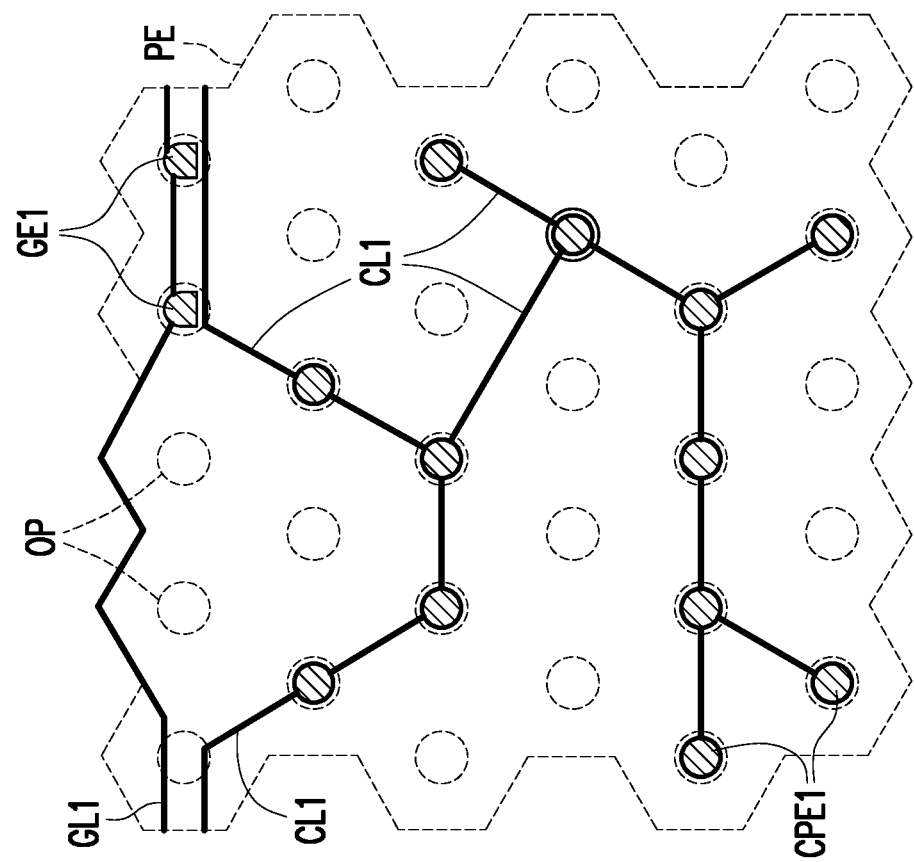
FIG. 5A
FIG. 5B

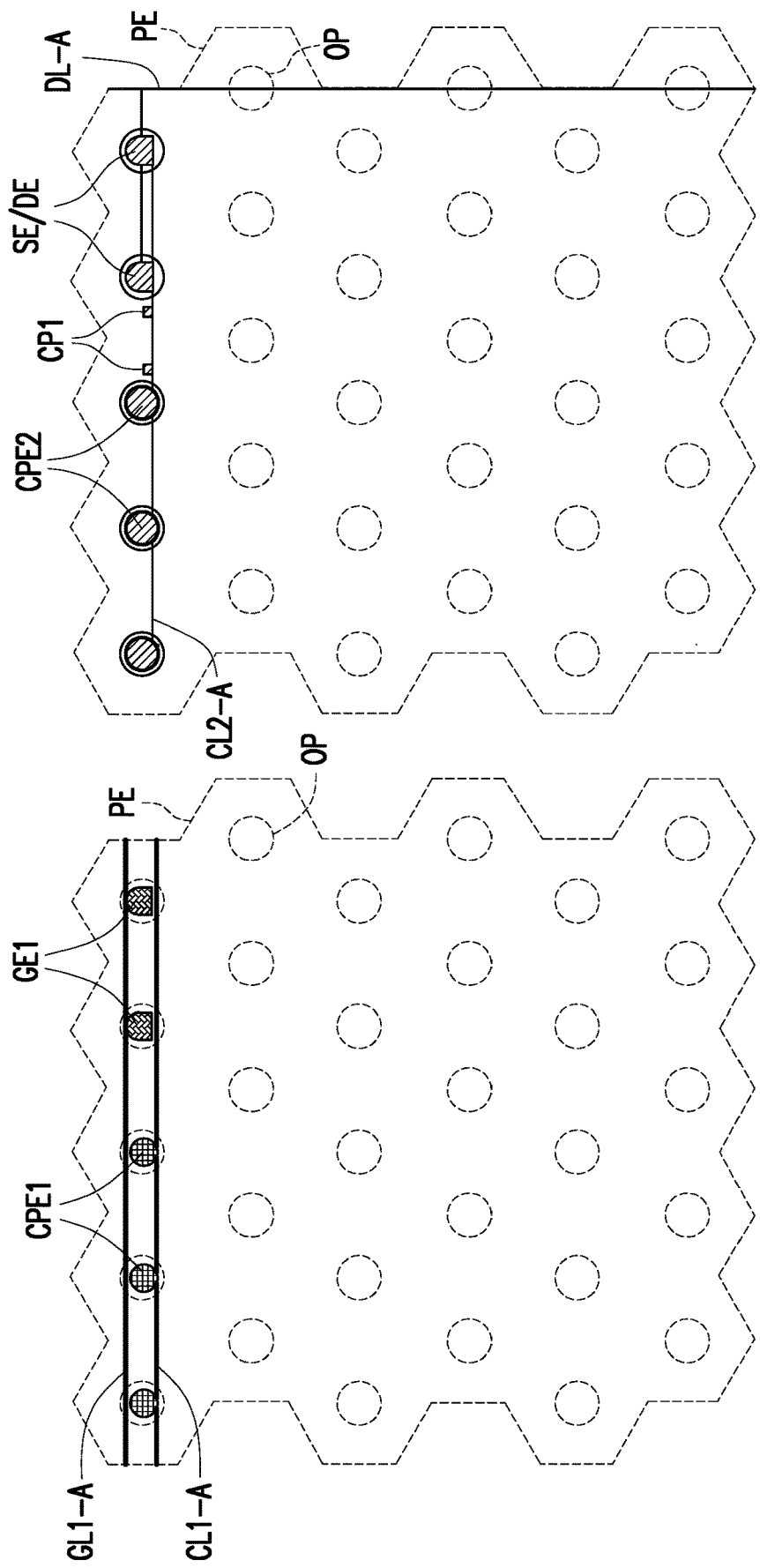

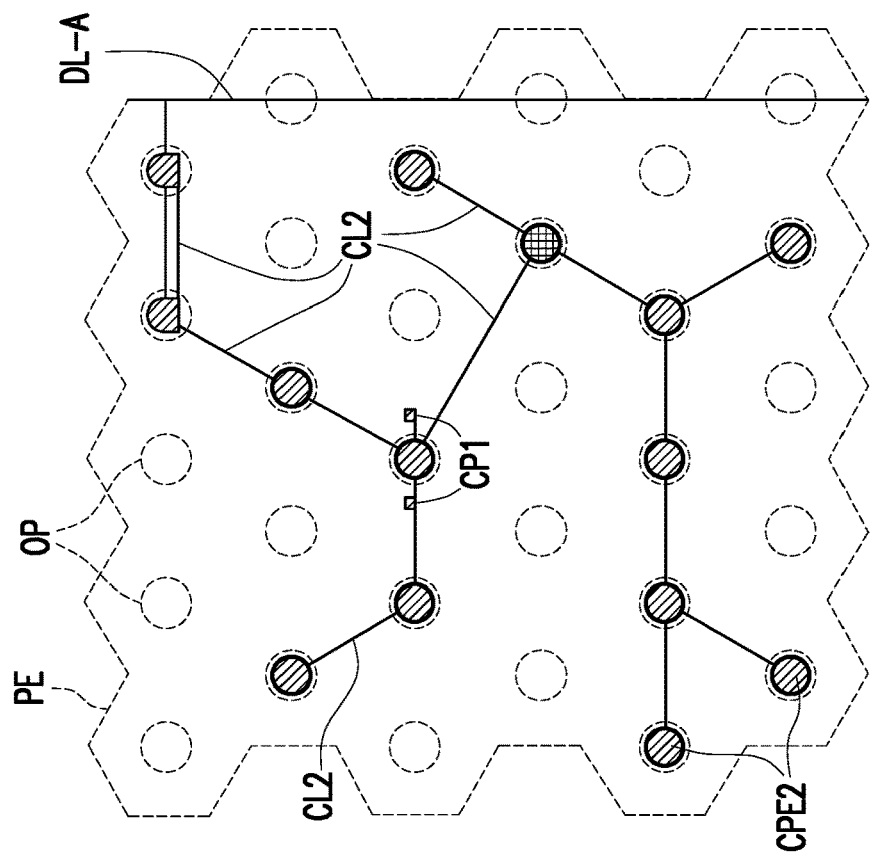
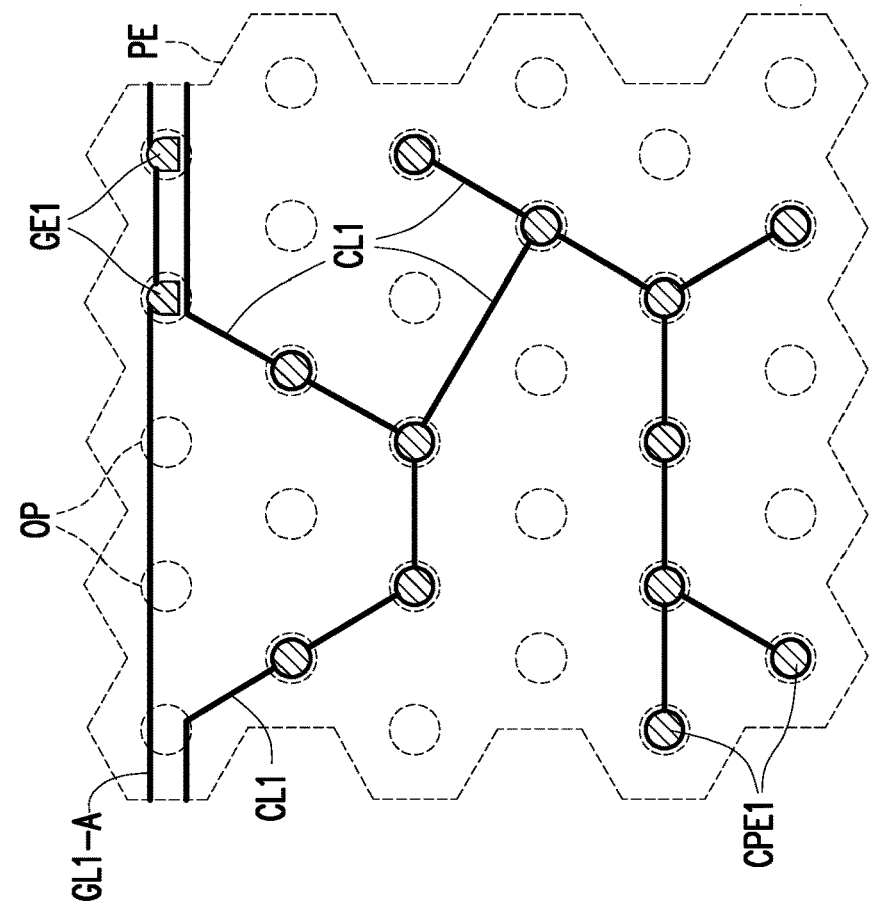

PIXEL ARRAY SUBSTRATE AND ELECTROWETTING DISPLAY PANEL

CROSS-REFERENCE TO RELATED APPLICATION

This application claims the priority benefit of Taiwan application serial no. 111131368, filed on Aug. 19, 2022. The entirety of the above-mentioned patent application is hereby incorporated by reference herein and made a part of this specification.

BACKGROUND

Technical Field

The disclosure relates to a display technology, and more particularly, to a pixel array substrate and an electrowetting display panel.

Related Art

In recent years, e-paper and e-books are booming, and display panels with lighter, thinner, and flexible properties will be the main development trend in the future. An electrowetting display panel is a display panel that may be applied to e-books and e-papers. A typical electrowetting display panel includes an upper electrode, a lower electrode as well as a hydrophilic layer and an ink layer sandwiched between the two electrodes. When no voltage is applied, the ink layer is filled with pixel cells. This causes an incident light to be absorbed by the ink layer and pixel units to appear in a dark state.

To make the pixel units appear in a bright state, a voltage is applied to the ink layer to shrink it and a reflective layer below the ink layer is exposed in a display unit, such that the incident light is reflected by the reflective layer. However, with the active driving structure, setup of related electronic components will sacrifice the opening rate of the display unit in the bright state, and is easy to be seen by human eyes. Further, the stacked structure of multiple electrowetting display panels proposed to meet the requirements of color display will also produce interference textures between periodic structures, namely moiré, due to the setup of the above electronic components, resulting in a decrease in display quality.

SUMMARY

The disclosure provides a pixel array substrate, which has a better opening rate when applied to an electrowetting display panel.

The disclosure provides an electrowetting display panel suitable for multi-layer stacking, which has better overall display brightness.

The pixel array substrate of the disclosure includes a substrate and multiple pixel units. The pixel units are disposed on the substrate and each includes at least one active device, a pixel electrode, and at least one storage capacitor. The pixel electrode is electrically connected to the at least one active device and has multiple openings. The at least one storage capacitor is electrically connected to the pixel electrode and the at least one active device. The at least one storage capacitor completely overlaps a part of the multiple openings of the pixel electrode.

The electrowetting display panel of the disclosure includes a pixel array substrate, a hydrophobic layer, an opposite substrate, a barrier wall structure layer, an ink layer, and a polar fluid layer. The pixel array substrate includes a substrate and multiple pixel units. The multiple pixel units are disposed on the substrate and each includes at least one active device, a pixel electrode, and at least one storage capacitor. The pixel electrode is electrically connected to the at least one active device and has multiple openings. The at least one storage capacitor is electrically connected to the pixel electrode and the at least one active device. The at least one storage capacitor completely overlaps a part of the openings of the pixel electrode. The hydrophobic layer is disposed on the pixel array substrate. The opposite substrate is disposed overlapping the pixel array substrate and provided with a transparent conductive layer. The barrier wall structure layer is disposed between the pixel array substrate and the opposite substrate and defines multiple microchambers. The openings of the pixel electrode respectively overlap the microchambers. The ink layer and the polar fluid layer are disposed within the microchambers. The ink layer is located between the polar fluid layer and the hydrophobic layer.

Based on the above, in the electrowetting display panel according to an embodiment of the disclosure, the storage capacitors are disposed overlappingly a part of the openings of the pixel electrode of the pixel array substrate. When a display pixel of the electrowetting display panel is operated to appear in a bright state, the ink layer is concentrated in a zone of the multiple openings overlapping the pixel electrode. At this time, the storage capacitor will still be shielded by the ink layer and will not be exposed in a light-transmitting zone. Therefore, the opening rate of the electrowetting display panel in the bright state can be effectively increased, thereby improving the display brightness during operation.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 5A to 5C are schematic top views of part of a film layer of the pixel array substrate of FIG. 1.

FIGS. 9A to 9C are schematic top views of part of a film layer of the pixel array substrate of FIG. 8.

FIGS. 11A to 11C are schematic top views of part of a film layer of the pixel array substrate of FIG. 10.

DESCRIPTION OF THE EMBODIMENTS

Figure 1:
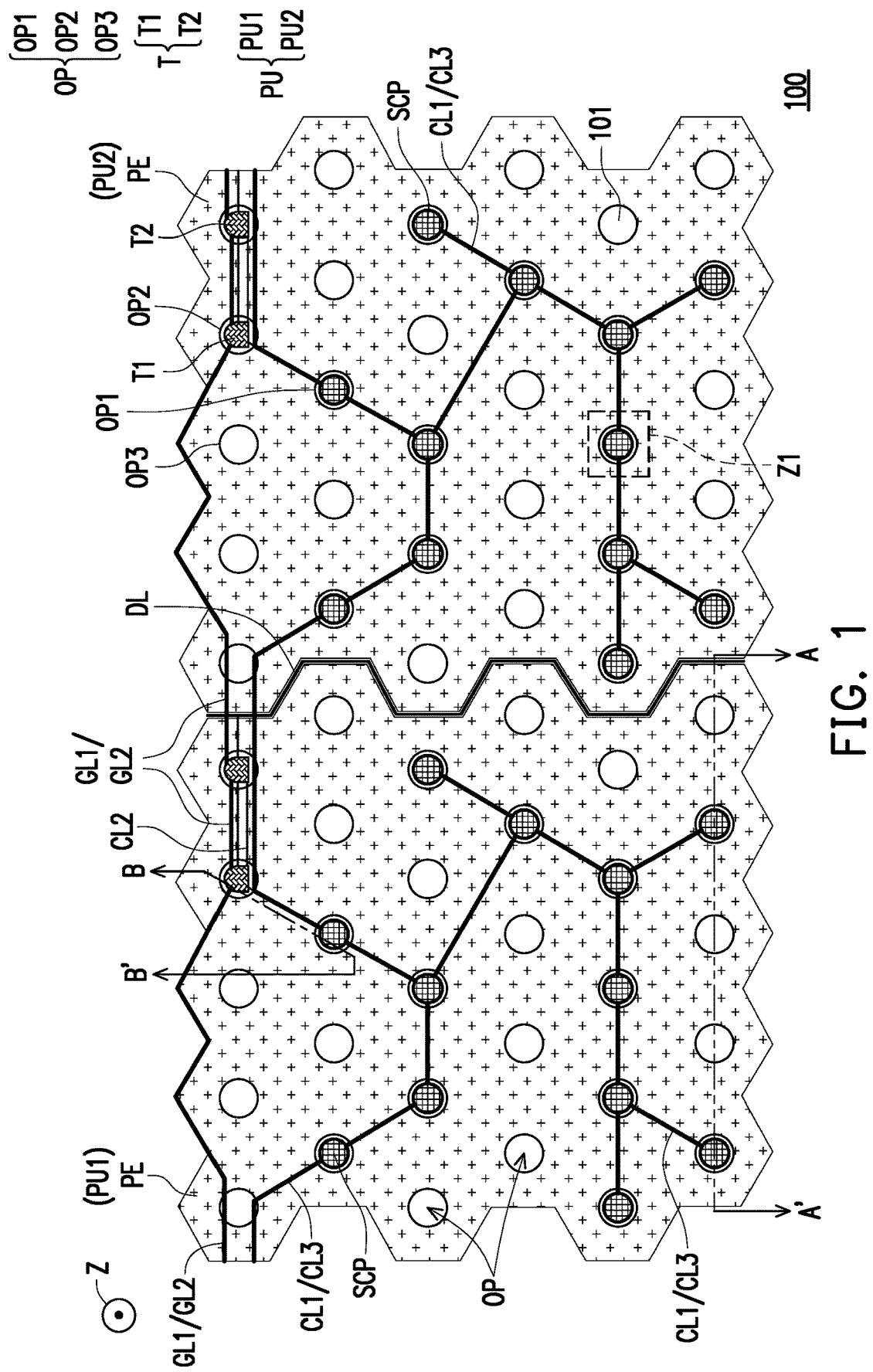
FIG. 1 is a schematic top view of a pixel array substrate according to a first embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

As used herein, "about", "approximately", or "substantially" includes a stated value and an average value within an acceptable deviation of the specific value as determined by one of ordinary skill in the art, taking into account the measurement and the specific amount of measurement-related error (i.e. the limitation of the measurement system). For example, "about" may mean within one or more standard deviations of the stated value, or within ±30%, ±20%, ±15%, ±10%, ±5%. Moreover, with respect to the terms "about", "approximately", or "substantially" as used herein, a more acceptable range or standard deviation may be selected based on measurement properties, cutting properties, or other properties, instead of using one standard deviation for all properties.

In the drawings, the thickness of layers, films, panels, zones and the like are enlarged for the sake of clarity. It should be understood that when an element such as a layer, film, zone or substrate is referred to as being "on" or "connected to" another element, it may be directly on or connected to that other element, or there may be an intermediate element. In contrast, when an element is referred to as being "directly on" or "directly connected to" another element, there is no intermediate element. As used herein, "connected" may refer to a physical and/or electrical connection. Moreover, "electrical connection" may refer to the existence of other elements between two elements.

Furthermore, relative terms such as "lower" or "bottom" and "upper" or "top" may be used herein to describe the relationship of one element's relation to another element, as shown in the drawings. It should be understood that the relative terms are intended to encompass different orientations of the device in addition to the orientation shown in the drawings. For example, if a device in a drawing is turned over, an element having been described as being on the "lower" side of another element would then be oriented at the "upper" side of that another element. Thus, the exemplary term "lower" may include an orientation of "lower" and an orientation of "upper", depending on the particular orientation of the drawing. Similarly, if a device in a drawing is turned over, an element having been described as "below" or "under" another element would then be oriented as "above" the other element. Thus, the exemplary term "above" or "below" may encompass both the orientation of above and below.

Exemplary embodiments are described herein with reference to cross-sectional views that are schematic views of idealized embodiments. Thus, variations in the shape of a figure as a result of, for example, manufacturing techniques and/or tolerances may be expected. Accordingly, the embodiments described herein should not be construed as limited to a particular shape of a region as shown herein, but rather include shape deviations resulting from, for example, manufacturing tolerance. For example, a region shown or described as flat may generally have rough and/or non-linear features. Moreover, a shown acute angle may be round. Thus, a region shown in the figure is essentially schematic, and a shape thereof is not intended to show an accurate shape of the region and is not intended to limit the claims of the disclosure.

Reference will now be made in detail to exemplary embodiments of the disclosure, examples of which are illustrated in the accompanying drawings. Wherever possible, the same reference numerals are used in the drawings and description to refer to the same or like parts.

Figure 2A:
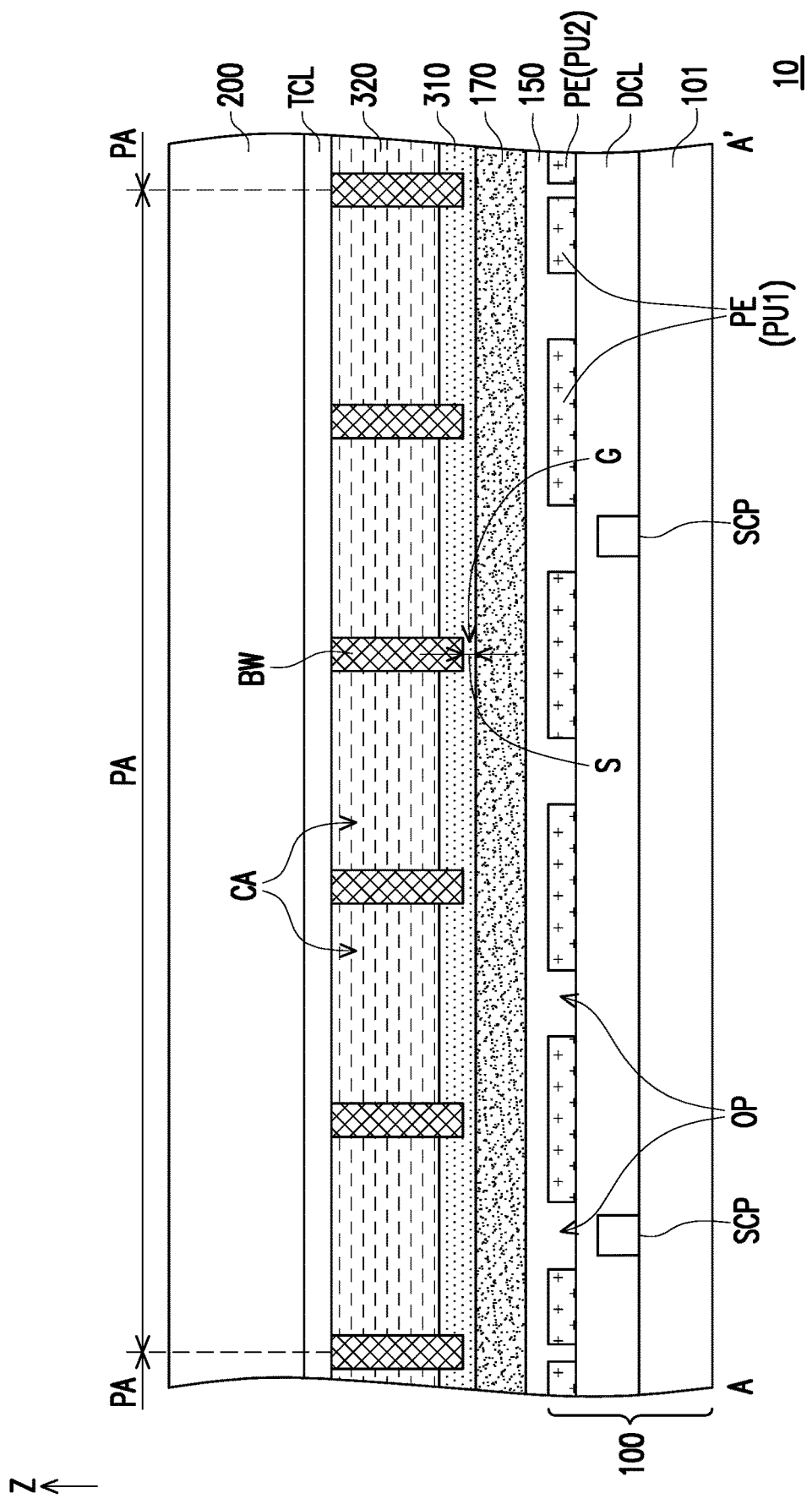
FIG. 2A and FIG. 2B are schematic cross-sectional views of an electrowetting display panel according to a first embodiment of the disclosure.
Figure 2B:
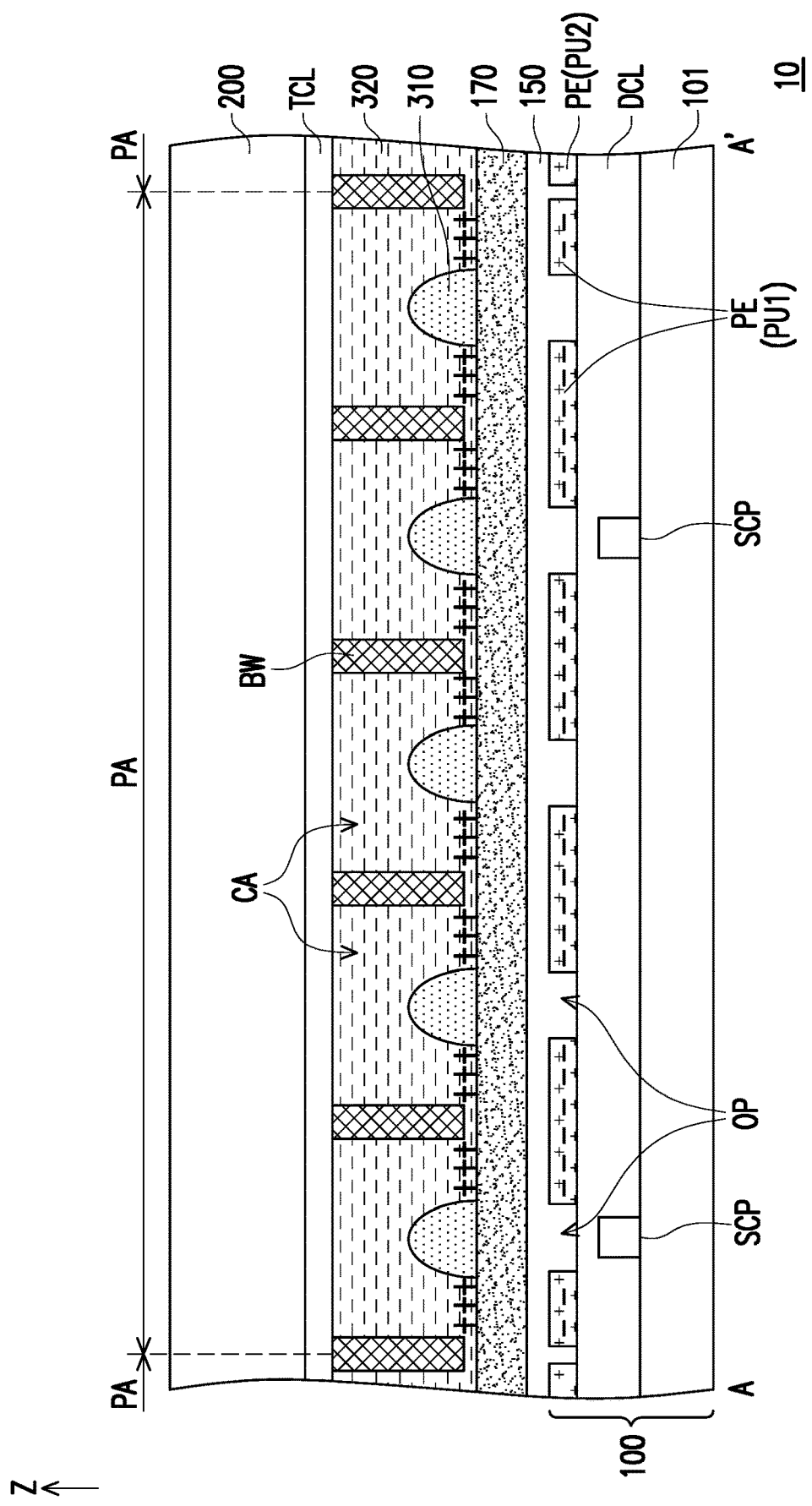
Figure 3:
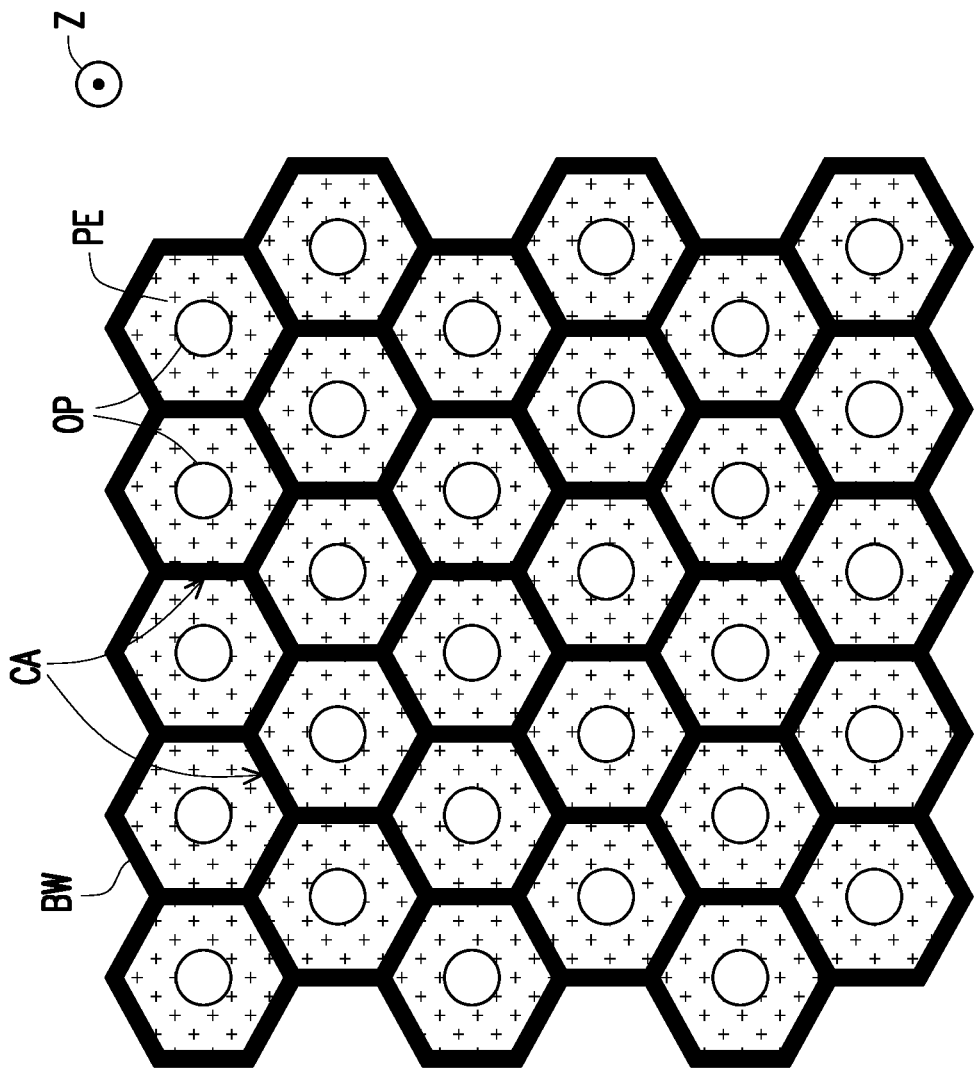
FIG. 3 is a schematic top view of a barrier wall structure layer and a pixel electrode of FIG. 2A and FIG. 2B.
Figure 4:
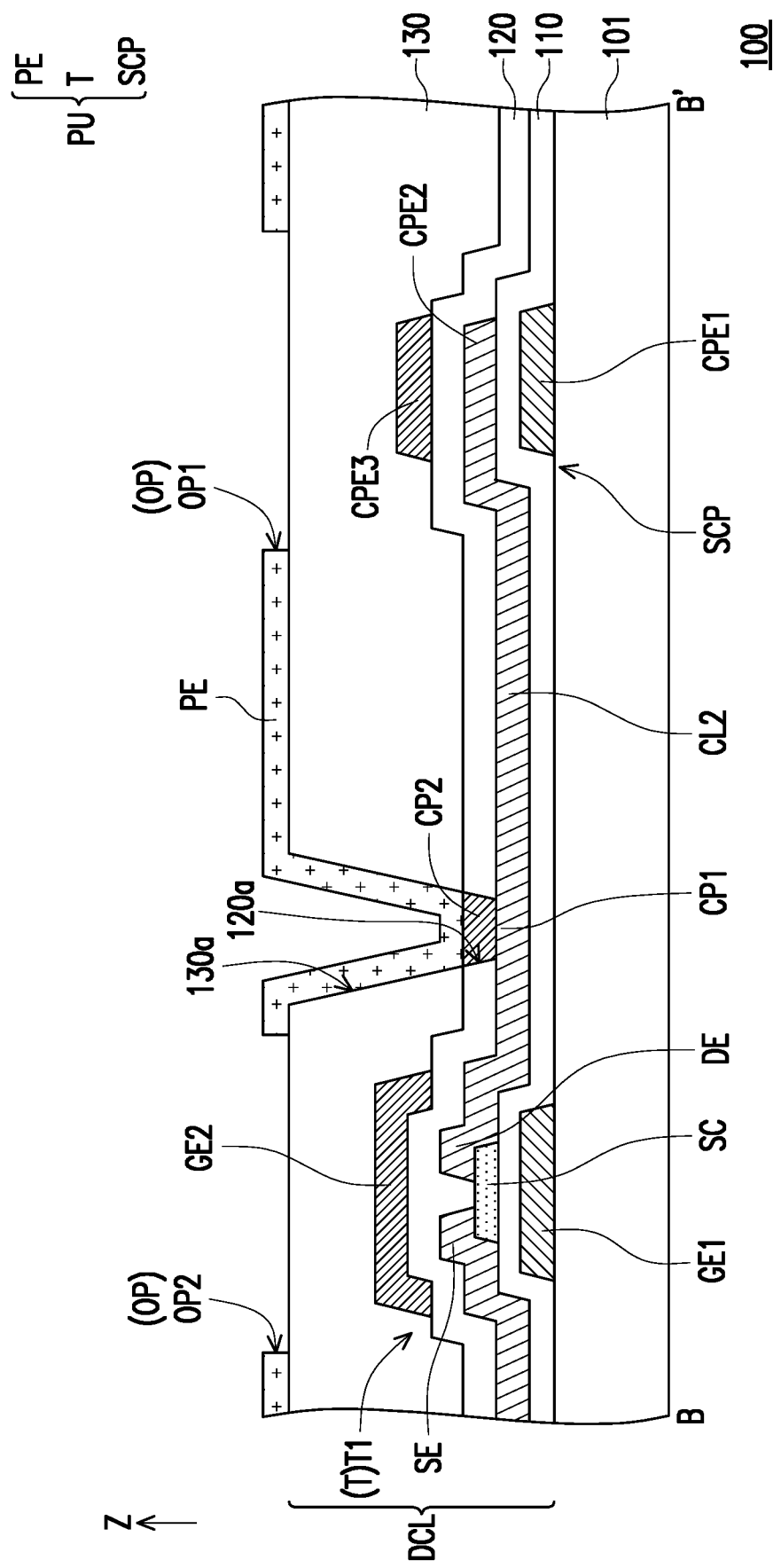
FIG. 4 is a schematic cross-sectional view of the pixel array substrate of FIG. 1.
Figure 6:
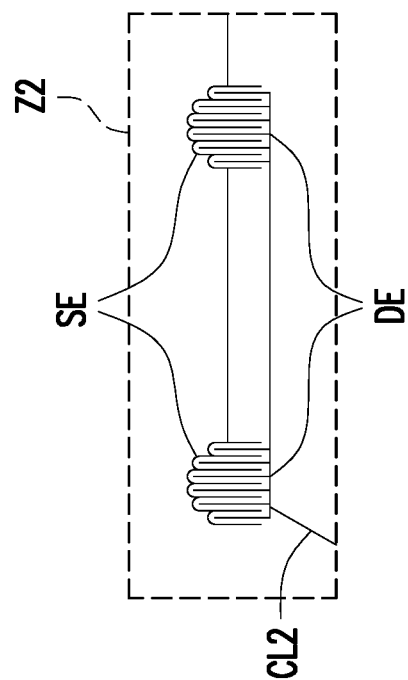
FIG. 6 is an enlarged schematic view of a partial zone of a second metal layer of FIG. 5B.
Figure 5C:
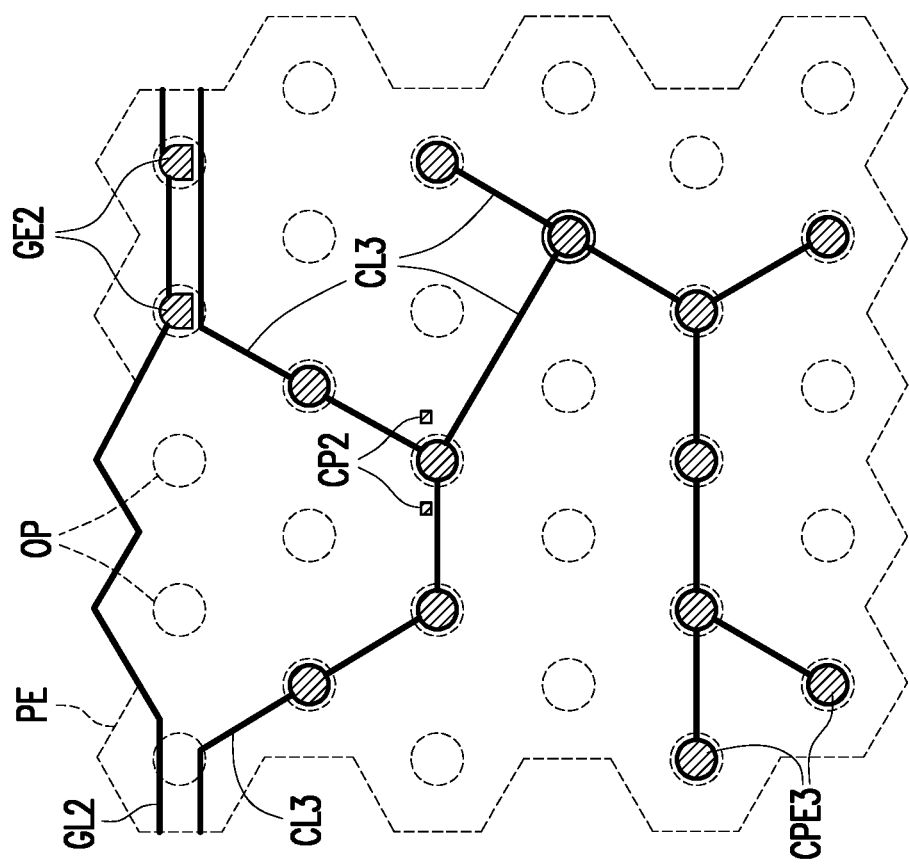
Figure 7:
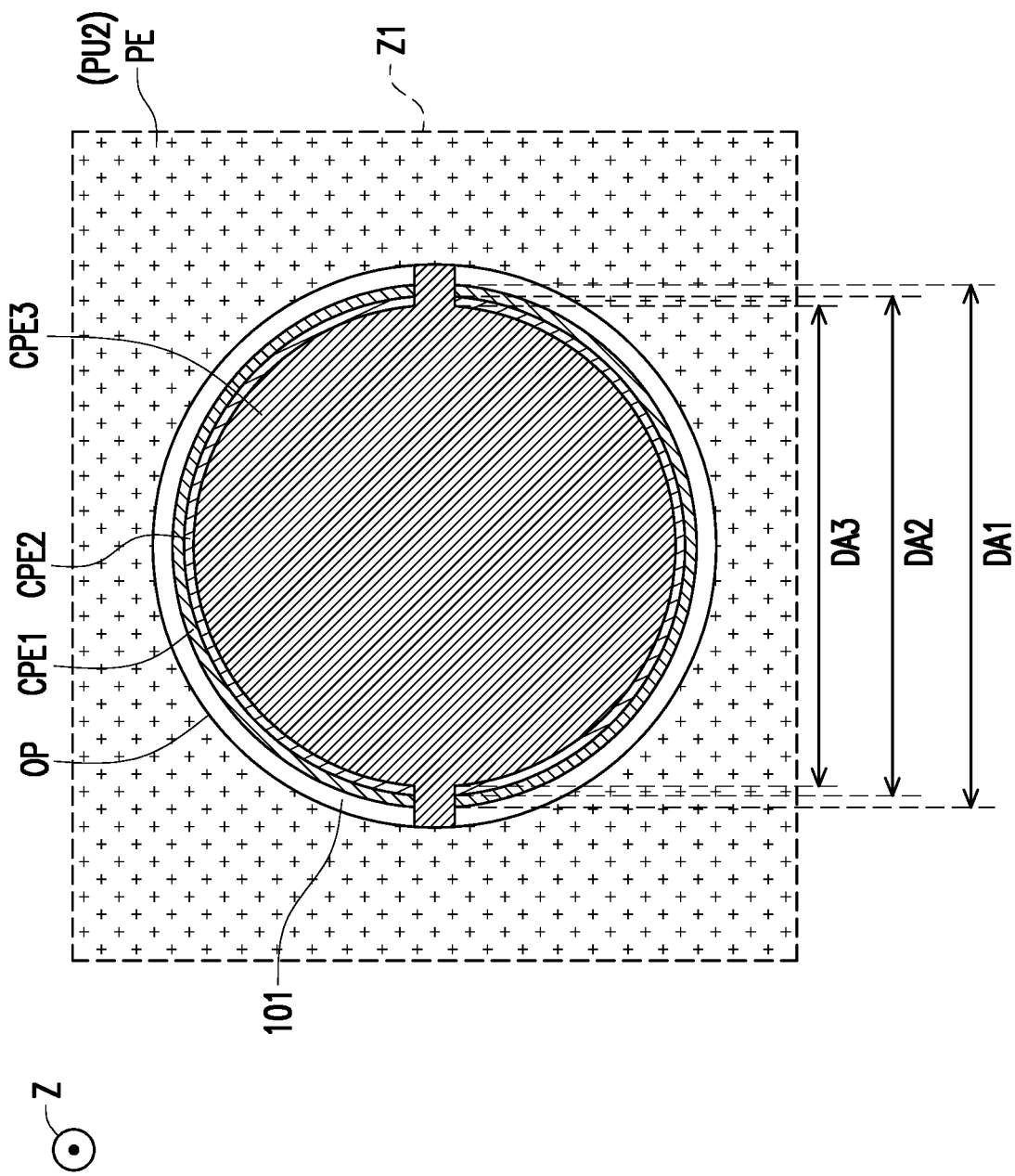
FIG. 7 is an enlarged schematic view of a storage capacitor of the pixel array substrate of FIG. 1.

FIG. 1 is a schematic top view of a pixel array substrate according to a first embodiment of the disclosure. FIG. 2A and FIG. 2B are schematic cross-sectional views of an electrowetting display panel according to a first embodiment of the disclosure. FIG. 3 is a schematic top view of a barrier wall structure layer and a pixel electrode of FIG. 2A and FIG. 2B. FIG. 4 is a schematic cross-sectional view of the pixel array substrate of FIG. 1. FIGS. 5A to 5C are schematic top views of part of a film layer of the pixel array substrate of FIG. 1. FIG. 6 is an enlarged schematic view of a partial zone of a second metal layer of FIG. 5B. FIG. 7 is an enlarged schematic view of a storage capacitor of the pixel array substrate of FIG. 1. The pixel array substrate of FIG. 2A and FIG. 2B corresponds to a section line A-A' in FIG. 1. FIG. 4 corresponds to section line B-B' of FIG. 1. FIG. 6 corresponds to a zone Z2 of FIG. 5. FIG. 7 corresponds to a zone Z1 of FIG. 1.

Referring to FIGS. 1 to 3, an electrowetting display panel 10 includes a pixel array substrate 100, a hydrophobic layer 170, an opposite substrate 200, a barrier wall structure layer BW, an ink layer 310, and a polar fluid layer 320. The opposite substrate 200 is disposed overlapping the pixel array substrate 100. The hydrophobic layer 170 is disposed on the pixel array substrate 100, and an insulating layer 150 may be disposed between the hydrophobic layer 170 and the pixel array substrate 100. The barrier wall structure layer BW is disposed between the pixel array substrate 100 and the opposite substrate 200, and defines multiple microchambers CA. The ink layer 310 and the polar fluid layer 320 are arranged in these microchambers CA. The ink layer 310 is located between the polar fluid layer 320 and the hydrophobic layer 170.

The material of the hydrophobic layer 170 is, for example, fluoropolymer, Teflon, or other hydrophobic materials, and a film thickness thereof may be in the range of 1 μm to 2 μm. The material of the opposite substrate 200 is, for example, inorganic transparent materials (e.g. glass, quartz, or other suitable materials, or a combination of the above), organic transparent materials (e.g. polyimide, polymethyl methacrylate, plastic, polycarbonate, or other suitable materials, or derivatives of the above), or hard or soft light-transmitting materials such as the combination of the above. The disclosure takes glass as an example, but is not limited thereto.

In this embodiment, the ink layer 310 is suitable for absorbing light of a specific wavelength range, and its hydrophilicity may be changed by electrifying the polar fluid layer 320. For example, a driving circuit layer DCL and a pixel electrode PE that are electrically connected to each other may be disposed on the pixel array substrate 100. The opposite substrate 200 may be provided with a transparent conductive layer TCL. When the pixel electrode PE and the transparent conductive layer TCL are not electrified, the polar fluid layer 320 will be pushed by the ink layer 310 away from the hydrophobic layer 170, and the hydrophobic layer 170 will be covered by the ink layer 310 (as shown in FIG. 2A). At this time, light entering the microchamber CA is generally absorbed by the ink layer 310 and the electrowetting display panel 10 appears dark.

In contrast, when the pixel electrode PE and the transparent conductive layer TCL are electrified (e.g. electrically connected to a DC voltage source), with the charge distribution generated on the surface, the hydrophobic layer 170 will increase its affinity for the polar fluid layer 320, such that the polar fluid layer 320 may be driven to squeeze the ink layer 310 away and adsorb it to the hydrophobic layer 170 (as shown in FIG. 2B). At this time, part of the light entering the microchamber CA will not be absorbed by the ink layer 310, but will pass through the microchamber CA and be reflected by the reflective layer (not shown) such that the electrowetting display panel 10 appears bright. The polar fluid layer 320 is, for example, water or alcohols, but not limited thereto.

Further, the pixel array substrate 100 includes a substrate 101 and multiple pixel units PU disposed on the substrate 101. Although FIG. 1 only shows a pixel unit PU1 and a pixel unit PU2 that are adjacently arranged in the horizontal direction for exemplary illustration, it should be understood that the multiple pixel units PU in this embodiment may be arranged in multiple columns and multiple rows respectively along the horizontal direction and the vertical direction of FIG. 1 to form a complete display surface. In this embodiment, each pixel unit PU may be provided with more than one pixel electrode PE, and the pixel electrode PE may define a pixel zone PA of the electrowetting display panel 10. In other words, there is one pixel unit in each pixel zone PA.

Referring to FIG. 1 and FIG. 4, the driving circuit layer DCL includes an active device T and a storage capacitor SCP. The pixel electrode PE is electrically connected to the active device T and the storage capacitor SCP. The active device T, the storage capacitor SCP, and the pixel electrode PE may constitute a pixel unit PU. It should be noted that the number of active devices T and the storage capacitors SCP of each pixel unit PU may be multiple. For example, in this embodiment, the number of active devices T of each pixel unit PU (e.g. the pixel unit PU1 and the pixel unit PU2) may be two (e.g. a first active device T1 and a second active device T2), and the number of storage capacitors SCP may be twelve, but disclosure is not limited thereto. In other embodiments not shown, the number of the active devices T and the storage capacitors SCP of each pixel unit may be adjusted according to the electrical requirements of the actual product.

In this embodiment, the pixel electrode PE has multiple openings OP, and the openings OP overlap the multiple microchambers CA defined by the barrier wall structure layer BW. The overlapping relationship here means, for example, that two members overlap each other along a stacking direction (e.g. direction Z) of the substrate 101 and the opposite substrate 200 (as shown in FIG. 2A and FIG. 3). The overlapping relationship between the two components below described in the following is also defined in the same manner, unless specifically mentioned, and the overlapping directions of the two components will not be repeated. Although the openings OP shown in FIG. 3 are approximately located at a geometric center of the overlapping microchamber CA, the disclosure is not limited thereto. In other embodiments not shown, the openings OP may also be disposed deviating from the geometric center of the microchamber CA. In this embodiment, a width of the pixel electrode PE along the horizontal direction or the vertical direction of FIG. 1 is, for example, 2.5 mm, and a diameter of the opening OP may be in the range of 180 μm to 220 μm, but the disclosure is not limited thereto.

Specifically, these openings OP may define a concentrated zone where the ink layer 310 is squeezed by the polar fluid layer 320 and shrinks when the pixel electrode PE is electrified (as shown in FIG. 2B). In other words, no matter whether the pixel electrode PE and the transparent conductive layer TCL are electrified on or not, the light entering the zones defined by the openings OP of the pixel electrode PE will be absorbed by the ink layer 310 and cannot pass through the microchamber CA.

In order to avoid affecting an opening rate of the pixel unit PU in the bright state due to the setting of the storage capacitor SCP, the storage capacitor SCP may be disposed in a zone overlapping the opening OP of the pixel electrode PE. As shown in FIG. 1, the twelve storage capacitors SCP of this embodiment may be respectively disposed overlapping a part of the openings OP of the pixel electrode PE. In this embodiment, the first active device T1 and the second active device T2 of the pixel unit PU may also be respectively disposed overlapping another part of the openings OP of the pixel electrode PE, but the disclosure is not limited thereto. In other embodiments, the active device of the pixel unit may not need to overlap the opening OP of the pixel electrode PE.

More specifically, in this embodiment, the twelve storage capacitors SCP completely overlap the twelve openings OP of the pixel electrode PE, respectively, and the two active devices T completely overlap the other two openings OP of the pixel electrode PE, respectively. For example, an orthographic projection area of each of the storage capacitor SCP and the active device T on the substrate 101 may be smaller than or equal to an orthographic projection area of the opening OP on the substrate 101.

It should be noted that, for an opening OP overlapping the active device T or the storage capacitor SCP, at least one opening OP among the adjacent multiple (e.g. six in this embodiment) openings OP also overlaps the active device T or the storage capacitor SCP. This allows for a more continuous arrangement and distribution of the twelve storage capacitors SCP and the two active devices T, simplifying the design of the wires for electrically connecting these storage capacitors SCP and the active devices T (e.g. a connection wire CL1, a connection wire CL2, and a connection wire CL3 as shown in FIG. 1).

On the other hand, for an opening OP overlapping the active device T or the storage capacitor SCP, at least one opening OP among the adjacent multiple (e.g. six in this embodiment) openings OP does not overlap the active device T or the storage capacitor SCP. Thus, even if the arrangement of these storage capacitors SCP and the two active devices T is continuous, a closed loop will not be formed. Accordingly, in the manufacturing process of the electrowetting display panel 10, the fluidity of the ink layer 310 and the polar fluid layer 320 can be increased when they are coated on the hydrophobic layer 170, which facilitates uniform distribution of the ink layer 310 and the polar fluid layer 320 in the multiple microchambers CA of the barrier wall structure layer BW.

For example, as shown in the pixel unit PU2 of FIG. 1, a first active device T1 and a storage capacitor SCP completely overlap, respectively, an opening OP2 (i.e. a second opening) and an opening OP1 (i.e. a first opening) arranged adjacently in one direction, while another opening OP3 (i.e. a third opening) arranged adjacent to the opening OP1 in the other direction does not overlap any storage capacitor SCP or the active device T.

Referring to FIG. 2A, a gap G may be provided between the barrier wall structure layer BW and the hydrophobic layer 170, and the multiple microchambers CA may be communicated through the gap G. For example, the barrier wall structure layer BW and the hydrophobic layer 170 have a distance S along the direction Z, and the distance S may be in the range of 0.5 micrometers to 7 micrometers. Accordingly, during the assembly process of the opposite substrate 200 and the pixel array substrate 100, the fluidity of the ink layer 310 and the polar fluid layer 320 between different microchambers CA can be increased, which helps to improve the assembly yield.

Further, referring to FIG. 1 and FIG. 4, the active device T may include a semiconductor pattern SC, a first gate electrode GE1, a second gate electrode GE2, a source electrode SE, and a drain electrode DE. The first gate electrode GE1 is disposed between the substrate 101 and the semiconductor pattern SC, and is disposed overlapping the semiconductor pattern SC. The second gate electrode GE2 is disposed on a side of the semiconductor pattern SC away from the first gate electrode GE1 and is disposed overlapping the semiconductor pattern SC. The source electrode SE and the drain electrode DE are respectively electrically connected to two different places of the semiconductor pattern SC. An insulating layer 110 is provided between the first gate electrode GE1 and the semiconductor pattern SC. The source electrode SE, the drain electrode DE, and the semiconductor pattern SC are covered with an insulating layer 120, and the second gate electrode GE2 is disposed on the insulating layer 120. In other words, the active device T of this embodiment is an active device having a double gate electrode structure.

In this embodiment, the active device T is, for example, an amorphous Silicon TFT (a-Si TFT), but not limited thereto. In other embodiments, the active device T may also be a low temperature polysilicon thin film transistor (LIPS TFT), a microcrystalline silicon thin film transistor (micro-Si TFT) or a metal oxide transistor. The active device T is covered with a flat layer 130. The pixel electrode PE is disposed on the flat layer 130 and is electrically connected to the drain electrode DE of the active device T. A thickness of the flat layer 130 may be in the range of 2.5 micrometers to 3 micrometers.

On the other hand, the storage capacitor SCP is, for example, a laminated structure of a first capacitor electrode CPE1, a second capacitor electrode CPE2, and a third capacitor electrode CPE3, but not limited thereto. The insulating layer 110 is provided between the first capacitor electrode CPE1 and the second capacitor electrode CPE2, and the insulating layer 120 is provided between the second capacitor electrode CPE2 and the third capacitor electrode CPE3.

Referring to FIG. 4 and FIG. 5A, the first gate electrode GE1 of the active device T and the first capacitor electrode CPE1 of the storage capacitor SCP may be in the same film layer (e.g. a first metal layer). In order to electrically connect the multiple first capacitor electrodes CPE1 of the multiple storage capacitors SCP to each other, the first metal layer may further be formed with the connection wire CL1. The multiple first capacitor electrodes CPE1 are all located on an extension path of the connection wire CL1 and are electrically connected to the connection wire CL1. More specifically, the first capacitor electrodes CPE1 may be multiple conductive patterns extending from the connection wire CL1 respectively, and the conductive patterns respectively overlap a part of the openings OP of the pixel electrode PE.

Moreover, a first scan line GL1 is formed in the first metal layer, wherein the first gate electrode GE1 of the first active device T1 and the first gate electrode GE1 of the second active device T2 are both electrically connected to the first scan line GL1. It should be noted that, in this embodiment, part of a line segment of the first scan line GL1 may be conformal to and overlapping part of an edge contour of the pixel electrode PE. More specifically, part of the line segment of the first scan line GL1 may be disposed completely overlapping the barrier wall structure layer BW (as shown in FIG. 3), but not limited thereto. Accordingly, the opening rate of the pixel unit PU in the bright state can be further increased, thereby improving the display brightness of the electrowetting display panel 10 during operation.

Referring to FIG. 4, FIG. 5B, and FIG. 6, the source electrode SE and the drain electrode DE of the active device T and the second capacitor electrode CPE2 of the storage capacitor SCP may be in the same film layer (e.g. the second metal layer). In order to electrically connect the multiple second capacitor electrodes CPE2 of the multiple storage capacitors SCP to each other, the second metal layer may further be formed with the connection wire CL2. The multiple second capacitor electrodes CPE2 are all located on an extension path of the connection wire CL2 and are electrically connected to the connection wire CL2. More specifically, the second capacitor electrodes CPE2 may be multiple conductive patterns extending from the connection wire CL2 respectively, and the conductive patterns respectively overlap a part of the openings OP of the pixel electrode PE. The drain electrode DE of the first active device T1 and the drain electrode DE of the second active device T2 are both electrically connected to the connection wire CL2.

Moreover, a data line DL is also formed in the second metal layer, wherein the source electrode SE of the first active device T1 and the source electrode SE of the second active device T2 are both electrically connected to the data line DL. It should be noted that, in this embodiment, the data line DL may be conformal to part of the edge contour of the pixel electrode PE and be spaced apart from the pixel electrode PE, but the disclosure is not limited thereto. In other embodiments not shown, part of the edge contour of the pixel electrode PE may also overlap the data line DL. More specifically, in this embodiment, the data line DL may be disposed completely overlapping the barrier wall structure layer BW (as shown in FIG. 3), but not limited thereto. Accordingly, the opening rate of the pixel unit PU in the bright state can be further increased, thereby improving the display brightness of the electrowetting display panel 10 during operation.

In this embodiment, the second metal layer may further be formed with a conductive pattern CP1. The conductive pattern CP1 is electrically connected to the connection wire CL2 and is structurally separated from the second capacitor electrode CPE2.

Referring to FIG. 4 and FIG. 5C, the second gate electrode GE2 of the active device T and the third capacitor electrode CPE3 of the storage capacitor SCP may be in to the same film layer (e.g. a third metal layer). In order to electrically connect the multiple third capacitor electrodes CPE3 of the multiple storage capacitors SCP to each other, the third metal layer may further be formed with the connection wire CL3. The multiple third capacitor electrodes CPE3 are all located on an extension path of the connection wire CL3 and are electrically connected to the connection wire CL3. More specifically, the third capacitor electrodes CPE3 may be multiple conductive patterns extending from the connection wire CL3 respectively, and the conductive patterns respectively overlap a part of the openings OP of the pixel electrode PE.

Moreover, a second scan line GL2 is formed in the third metal layer, wherein the second gate electrode GE2 of the first active device T1 and the second gate electrode GE2 of the second active device T2 are both electrically connected to the second scan line GL2. It should be noted that, in this embodiment, part of a line segment of the second scan line GL2 may be conformal to and overlapping part of the edge contour of the pixel electrode PE. More specifically, part of the line segment of the second scan line GL2 may be disposed completely overlapping the barrier wall structure layer BW (as shown in FIG. 3), but not limited thereto. Accordingly, the opening rate of the pixel unit PU in the bright state can be further increased, thereby improving the display brightness of the electrowetting display panel 10 during operation.

In this embodiment, the third metal layer may further be formed with a conductive pattern CP2. The conductive pattern CP2 is structurally independent from the second capacitor electrode CPE2 and the connection wire CL3. For example, the insulating layer 120 between the second metal layer and the third metal layer may have a contact hole 120a. The conductive pattern CP2 of the third metal layer may be disposed in the contact hole 120a of the insulating layer 120 and directly contact the conductive pattern CP1 of the second metal layer. In this embodiment, the flat layer 130 may have an opening 130a, and the pixel electrode PE disposed on the flat layer 130 may extend into the opening 130a to contact the conductive pattern CP2. In other words, the conductive pattern CP1 of the second metal layer and the conductive pattern CP2 of the third metal layer may serve as an electrical bridge structure between the pixel electrode PE and the drain electrode DE (or the connection wire CL2) of the active device T, but the disclosure is not limited thereto.

Referring to FIG. 1, in this embodiment, the connection wire CL1 and the connection wire CL3 may each have a fixed potential or a ground potential. In other words, the connection wire CL1 and the connection wire CL3 are, for example, common electrode wires, but not limited thereto. The potentials of the second capacitor electrode CPE2 and the connection wire CL2 may be adjusted by controlling the active device T. In particular, in order to maximize the opening rate of the pixel unit PU in the bright state, the first scan line GL1 of the first metal layer and the second scan line GL2 of the second metal layer may be disposed overlapping each other, the connection wire CL1 of the first metal layer, the connection wire CL2 of the second metal layer, and the connection wire CL3 of the third metal layer may be disposed overlapping each other. For example, the extension paths of the connection wire CL1, the connection wire CL2, and the connection wire CL3 between the multiple storage capacitors SCP are all substantially the same (as shown in FIGS. 5A to 5C).

Referring to FIG. 1 and FIG. 7, in this embodiment, a contour of an orthographic projection of the capacitor electrode of the storage capacitor SCP on the substrate 101 is, for example, round, but not limited thereto. In order to reduce the risk of film rupture or disconnection of the connection wires of each metal layer due to height difference when connecting the corresponding capacitor electrodes, a circular diameter DA1 of the first capacitor electrode CPE1 of the storage capacitor SCP may be larger than a circular diameter DA2 of the second capacitor electrode CPE2, and the circular diameter DA2 of the second capacitor electrode CPE2 may be larger than a circular diameter DA3 of the third capacitor electrode CPE3.

Hereinafter, other embodiments will be given to illustrate the disclosure in detail, wherein the same components will be described in same reference numerals, and the description of the same technical content will be omitted. Please refer to the above embodiments for the omitted parts, and details will not be repeated below.

Figure 8:
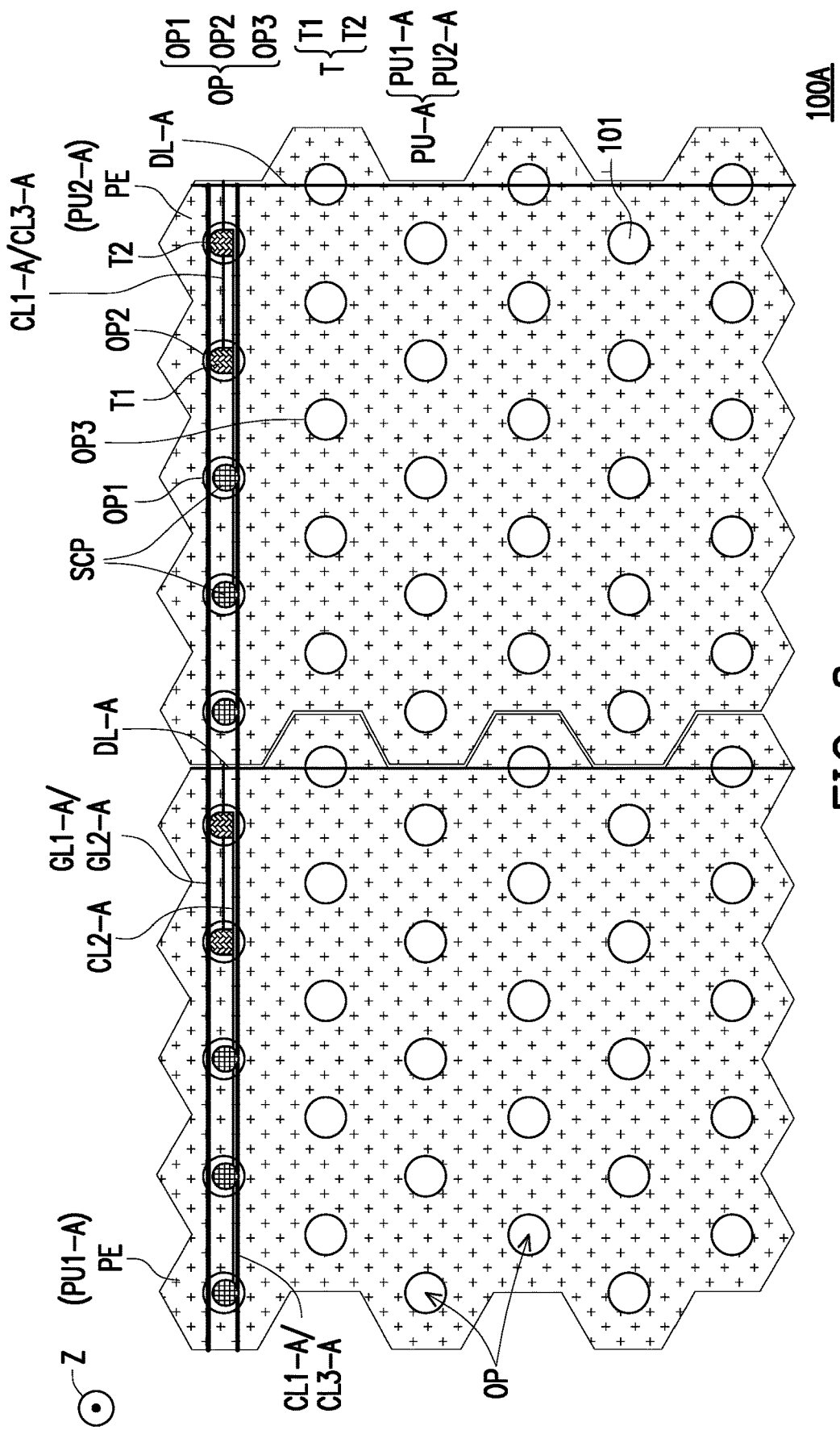
FIG. 8 is a schematic top view of a pixel array substrate according to a second embodiment of the disclosure.
Figure 9C:
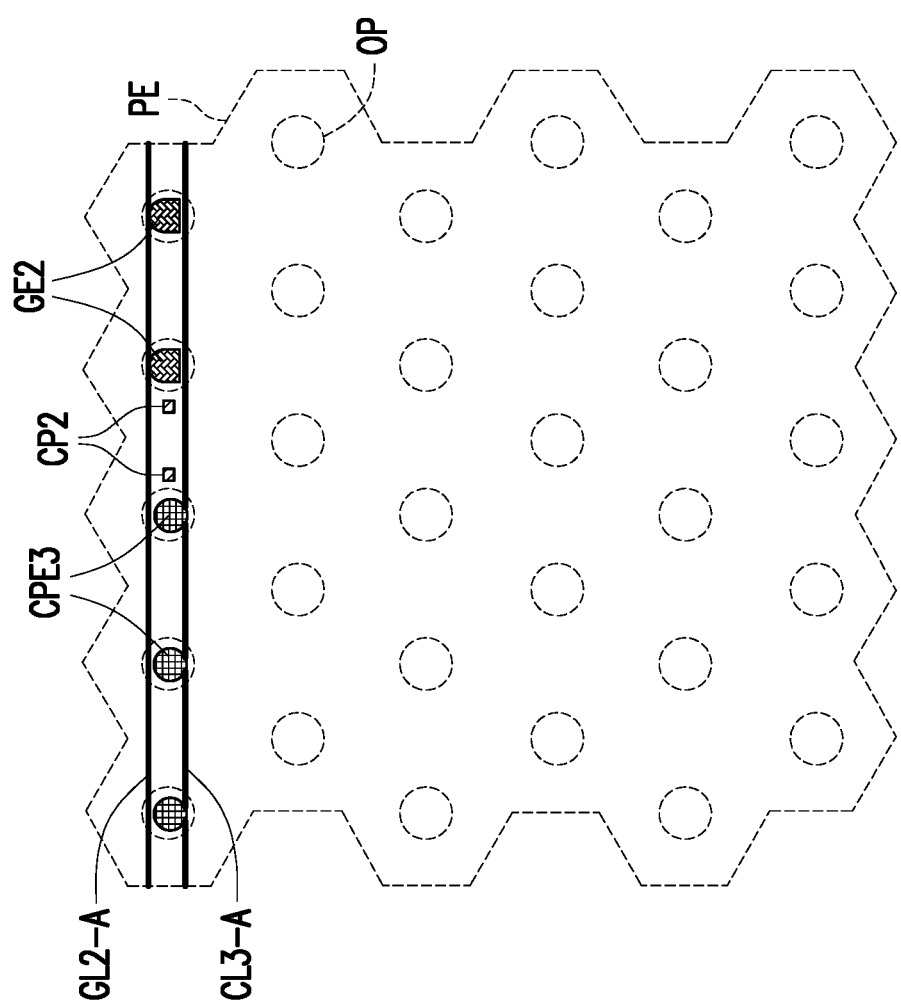

FIG. 8 is a schematic top view of a pixel array substrate according to a second embodiment of the disclosure. FIGS. 9A to 9C are schematic top views of part of a film layer of the pixel array substrate of FIG. 8. Referring to FIG. 8, the difference between a pixel array substrate 100A of this embodiment and the pixel array substrate 100 of FIG. 1 is that data lines, scan lines, connection wires, and storage capacitors are disposed differently. Specifically, in this embodiment, multiple (e.g. three) storage capacitors SCP and two active devices T of each of the multiple pixel units PU-A (e.g. a pixel unit PU1-A and a pixel unit PU2-A) are arranged along one direction (e.g. the horizontal direction in FIG. 8).

Correspondingly, a connection wire CL1-A of the first metal layer (as shown in FIG. 9A), a connection wire CL2-A of the second metal layer (as shown in FIG. 9B), and a connection wire CL3-A of the third metal layer of the pixel array substrate 100A (shown in FIG. 9C) also extend in the horizontal direction of FIG. 8.

On the other hand, in this embodiment, a first scan line GL1-A of the first metal layer (as shown in FIG. 9A) and a second scan line GL2-A of the third metal layer (as shown in FIG. 9C) may be optionally parallel to the connection wire CL1-A and the connection wire CL3-A. In other words, the first scan line GL1-A and the second scan line GL2-A in this embodiment do not have a line segment that is conformal to and overlapping part of the edge contour of the pixel electrode PE (e.g. zigzag line segments of the first scan line GL1 and the second scan line GL2 in FIG. 1). Similarly, a data line DL-A of this embodiment may not need to have a line segment conformal to part of the edge contour of the pixel electrode PE (e.g. a zigzag line segment of the data line DL in FIG. 1). More specifically, the data line DL-A only extends in a single direction (vertical direction in FIG. 8), and a part of the openings OP of the pixel electrode PE may overlap the data line DL-A.

Figure 10:
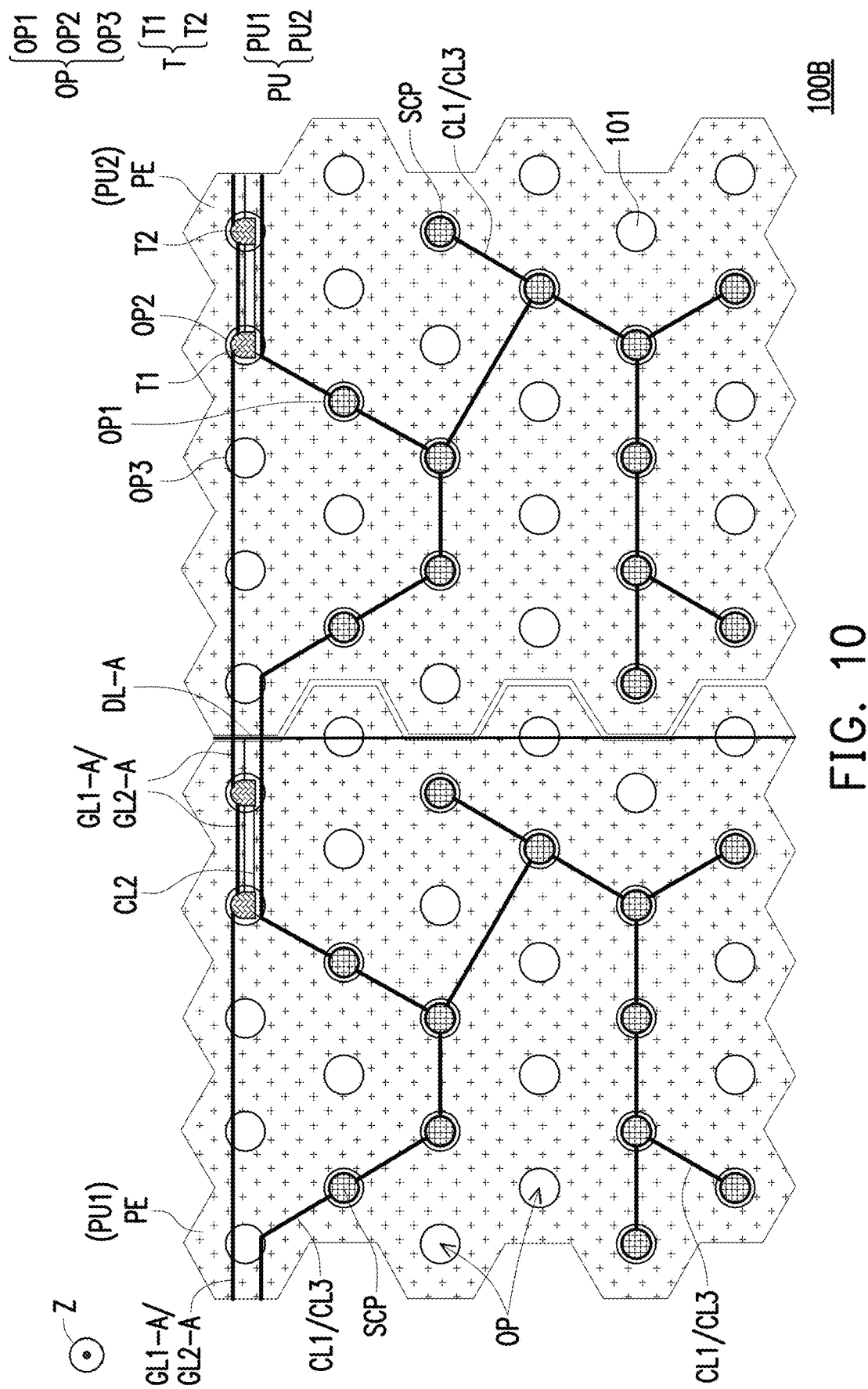
FIG. 10 is a schematic top view of a pixel array substrate according to a third embodiment of the disclosure.
Figure 11C:
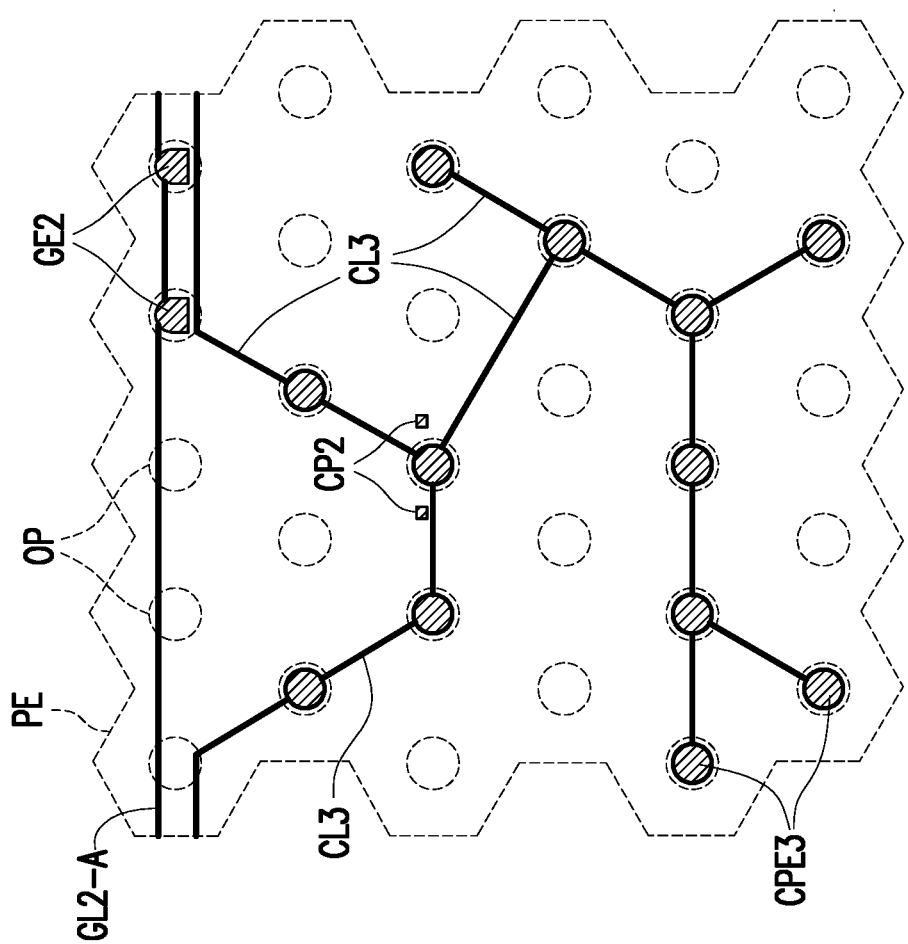

FIG. 10 is a schematic top view of a pixel array substrate according to a third embodiment of the disclosure. FIGS. 11A to 11C are schematic top views of part of a film layer of the pixel array substrate of FIG. 10. Referring to FIGS. 10 to 11C, the difference between a pixel array substrate 100B of this embodiment and the pixel array substrate 100 of FIG. 1 is that the data lines and scan lines are disposed differently.

In this embodiment, the data line DL-A of the pixel array substrate 100B may not need to have a line segment conformal to part of the edge contour of the pixel electrode PE (e.g. the zigzag line segment of the data line DL in FIG. 1). More specifically, the data line DL-A only extends in a single direction (the vertical direction in FIG. 10), and a part of the openings OP of the pixel electrode PE may overlap the data line DL-A. Similarly, the first scan line GL1-A (as shown in FIG. 11A) and the second scan line GL2-A (as shown in FIG. 11C) in this embodiment do not have a line segment that is conformal to and overlapping part of the edge contour of the pixel electrode PE (e.g. the zigzag line segments of the first scan line GL1 and the second scan line GL2 in FIG. 1).

Since the connection wire CL1, the connection wire CL2, the connection wire CL3, the storage capacitors SCP and the active devices T of this embodiment are all similar to the pixel array substrate 100 of FIG. 1, please refer to the relevant paragraphs of the foregoing embodiments for detailed description, and the details will be omitted herein. It is particularly noted that both the pixel array substrate 100A of FIG. 8 and the pixel array substrate 100B of FIG. 10 may be used to replace the pixel array substrate 100 of FIG. 2A to form other modified embodiments of the electrowetting display panel 10.

In summary, in the electrowetting display panel according to an embodiment of the disclosure, the storage capacitors are disposed overlappingly a part of the openings of the pixel electrode of the pixel array substrate. When a display pixel of the electrowetting display panel is operated to appear in a bright state, the ink layer is concentrated in a zone of the multiple openings overlapping the pixel electrode. At this time, the storage capacitor will still be shielded by the ink layer and will not be exposed in a light-transmitting zone. Therefore, the opening rate of the electrowetting display panel in the bright state can be effectively increased, thereby improving the display brightness during operation.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A pixel array substrate, comprising:
a substrate; and
a plurality of pixel units, disposed on the substrate and each comprising:
at least one active device;
a pixel electrode, electrically connected to the at least one active device and having a plurality of openings; and
at least one storage capacitor, electrically connected to the pixel electrode and the at least one active device, wherein each of the at least one storage capacitor completely overlaps one of the openings of the pixel electrode, the openings comprise a first opening and a second opening arranged adjacent to each other, a first storage capacitor of the at least one storage capacitor overlaps the first opening, and a second storage capacitor of the at least one storage capacitor or a first active device of the at least one active device overlaps the second opening.

2. The pixel array substrate according to claim 1, wherein an orthographic projection area of each of the at least one storage capacitor on the substrate is smaller than or equal to an orthographic projection area of each of the openings on the substrate.

3. The pixel array substrate according to claim 1, wherein an orthographic projection of each of the at least one active device on the substrate is located within an orthographic projection of another one of the openings of the pixel electrode on the substrate.

4. The pixel array substrate according to claim 3, wherein an orthographic projection area of each of the at least one active device on the substrate is smaller than or equal to an orthographic projection area of each of the openings on the substrate.

5. The pixel array substrate according to claim 1, wherein the openings further comprise a third opening, the third opening is arranged adjacent to the first opening, and the at least one storage capacitor and the at least one active device do not overlap the third opening.

6. The pixel array substrate according to claim 1, wherein each of the at least one active device comprises:
a semiconductor pattern;
a first gate electrode, disposed between the semiconductor pattern and the substrate;
a second gate electrode, disposed on a side of the semiconductor pattern away from the first gate electrode; and
a source electrode and a drain electrode, respectively electrically connected to two different places of the semiconductor pattern, the drain electrode electrically connected to the pixel electrode.

7. The pixel array substrate according to claim 6, wherein each of the at least one storage capacitor is a stacked structure of a first capacitor electrode, a second capacitor electrode, and a third capacitor electrode, the first capacitor electrode and the first gate electrode are in a same film layer, the second capacitor electrode, the source electrode, and the drain electrode are in a same film layer, and the third capacitor electrode and the second gate electrode are in a same film layer.

8. The pixel array substrate according to claim 1, wherein the at least one active device further comprises a second active device electrically connected to the first active device, the openings further comprise another one second opening arranged adjacent to the second opening and the first active device and the second active device overlap the second opening and the another one second opening respectively and are electrically connected to a same data line and a same scan line.

9. The pixel array substrate according to claim 1, further comprising a connection wire electrically connected to the at least one storage capacitor, wherein the part of the openings of the pixel electrode overlap the connection wire.

10. An electrowetting display panel, comprising:
a pixel array substrate, comprising:
a substrate; and
a plurality of pixel units, disposed on the substrate and each comprising:
at least one active device;
a pixel electrode, electrically connected to the at least one active device and having a plurality of openings; and
at least one storage capacitor, electrically connecting the pixel electrode and the at least one active device, wherein each of the at least one storage capacitor completely overlaps one of the openings of the pixel electrode, the openings comprise a first opening and a second opening arranged adjacent to each other, a first storage capacitor of the at least one storage capacitor overlaps the first opening, and a second storage capacitor of the at least one storage capacitor or a first active device of the at least one active device overlaps the second opening;
a hydrophobic layer, disposed on the pixel array substrate;
an opposite substrate, disposed overlapping the pixel array substrate and provided with a transparent conductive layer;
a barrier wall structure layer, disposed between the pixel array substrate and the opposite substrate and defining a plurality of microchambers, the openings of the pixel electrode overlapping the microchambers respectively;
an ink layer, disposed in the microchambers; and
a polar fluid layer, disposed in the microchambers, wherein the ink layer is located between the polar fluid layer and the hydrophobic layer.

11. The electrowetting display panel according to claim 10, wherein an orthographic projection of each of the at least one active device on the substrate is located within an orthographic projection of another one of the openings of the pixel electrode on the substrate.

12. The electrowetting display panel according to claim 11, wherein an orthographic projection area of each of the at least one storage capacitor or each of the at least one active device on the substrate is smaller than or equal to an orthographic projection area of each of the openings on the substrate.

13. The electrowetting display panel according to claim 10, wherein the openings further comprise a third opening, the third opening is arranged adjacent to the first opening, and the at least one storage capacitor and the at least one active device do not overlap the third opening.

14. The electrowetting display panel according to claim 10, wherein each of the at least one active device comprises:
a semiconductor pattern;
a first gate electrode, disposed between the semiconductor pattern and the substrate;
a second gate electrode, disposed on a side of the semiconductor pattern away from the first gate electrode; and
a source electrode and a drain electrode, respectively electrically connected to two different places of the semiconductor pattern, the drain electrode electrically connected to the pixel electrode.

15. The electrowetting display panel according to claim 14, wherein each of the at least one storage capacitor is a stacked structure of a first capacitor electrode, a second capacitor electrode, and a third capacitor electrode, the first capacitor electrode and the first gate electrode are in a same film layer, the second capacitor electrode, the source electrode, and the drain electrode are in a same film layer, and the third capacitor electrode and the second gate electrode are in a same film layer.

16. The electrowetting display panel according to claim 10, the at least one active device further comprises a second active device electrically connected to the first active device, the openings further comprise another one second opening arranged adjacent to the second opening, and the first active device and the second active device overlap the second opening and the another one second opening respectively and are electrically connected to a same data line and a same scan line.

17. The electrowetting display panel according to claim 10, further comprising a connection wire electrically connected to the at least one storage capacitor, wherein the part of the openings of the pixel electrode overlap the connection wire.

18. The electrowetting display panel according to claim 10, wherein a gap is formed between the barrier wall structure layer and the hydrophobic layer, and the microchambers are communicated through the gap.

* * * * *